United States Patent
Dickinson et al.

(10) Patent No.: US 8,556,775 B2
(45) Date of Patent: Oct. 15, 2013

(54) SYSTEM AND METHOD FOR REGULATING TORQUE TRANSMISSION IN A VEHICLE POWERTRAIN AND A VEHICLE POWERTRAIN USING SAME

(75) Inventors: Michael Thomas Dickinson, Hilliard, OH (US); Christopher Irwin Hopp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 13/282,220

(22) Filed: Oct. 26, 2011

(65) Prior Publication Data

US 2013/0109535 A1    May 2, 2013

(51) Int. Cl.
*B60W 10/02* (2006.01)
*B60W 10/06* (2006.01)

(52) U.S. Cl.
USPC ............................................. 477/181

(58) Field of Classification Search
USPC ................................. 477/174, 181
See application file for complete search history.

(56) References Cited

U.S. PATENT DOCUMENTS

| | | | |
|---|---|---|---|
| 5,176,118 A | 1/1993 | Norota | |
| 6,343,586 B1 | 2/2002 | Muto et al. | |
| 6,536,390 B2 | 3/2003 | Takahashi et al. | |
| 6,735,509 B2 | 5/2004 | Watanabe et al. | |
| 7,052,435 B2 | 5/2006 | Tabata et al. | |
| 7,115,065 B2 | 10/2006 | Tabata et al. | |
| 7,361,120 B2 * | 4/2008 | Iida et al. | 477/65 |
| 7,503,166 B2 | 3/2009 | Jankovic | |
| 7,530,924 B2 * | 5/2009 | Brevick | 477/176 |
| 2005/0096182 A1 * | 5/2005 | Ohta | 477/181 |
| 2009/0318262 A1 | 12/2009 | Fujita et al. | |
| 2010/0017101 A1 | 1/2010 | Leone et al. | |

FOREIGN PATENT DOCUMENTS

JP    2001-20802 A    1/2001

* cited by examiner

*Primary Examiner* — Edwin A Young
(74) *Attorney, Agent, or Firm* — Kenealy Vaidya LLP

(57) ABSTRACT

A system and method for regulating torque transmitted via a torque converter can include providing a lock up clutch between a crankshaft and transmission of a vehicle. A position sensor can output data indicative of at least one of an engaged position of the lock-up clutch, a transitional position of the lock-up clutch, and a disengaged position of the lock-up clutch. An engine speed sensor can output data indicative of rotational speed of the crankshaft. A controller can be placed in electrical communication with the engine speed sensor and the position sensor and configured to determine when actuation of the lock-up clutch is desired. The controller can be configured to determine a torque reduction target based on certain variables, for example, engine acceleration. The controller can then signal the engine to output torque substantially equal to the torque reduction target when conditions exist that warrant torque reduction.

21 Claims, 2 Drawing Sheets

SYSTEM AND METHOD FOR REGULATING TORQUE TRANSMISSION IN A VEHICLE POWERTRAIN AND A VEHICLE POWERTRAIN USING SAME

BACKGROUND

1. Field

The disclosed subject matter relates to devices, systems, and processes useful as a control for a vehicle engine when a torque convertor lock-up clutch is engaged.

2. Description of the Related Art

Existing vehicles powered by an internal combustion engine use various types of transmission systems for transmitting the power created by the engine to the drive wheel(s) of the vehicle. For example, an automatic transmission can be used that shifts gear ratios without direct input from the operator of the vehicle. Alternatively, semi-automatic transmissions are known that can shift gear ratios with or without direct input from the operator. In conjunction with these types of transmissions, an electronic control unit can be used to control when and which gear ratio is engaged based on any combination of inputs, such as, but not limited to gear selector position, throttle position, engine load, and vehicle speed.

A torque converter can be coupled between the engine and the automatic or semi-automatic transmission in order to multiply the torque output from the engine as well as to provide a fluid slip coupling that allows the crankshaft to rotate at a different rate than the input to the transmission (which allows the vehicle to idle). In order to improve fuel efficiency, the torque converter can include a lock-up clutch that can by-pass the fluid coupling of the torque converter. This can reduce energy loss via fluid friction within the fluid of the torque converter, thus improving fuel economy of the vehicle.

The same electronic control unit (or a different electronic control unit) can be used to determine the timing and to affect the engagement/disengagement of the lock-up clutch. As such, the operator does not need to decide when engagement/disengagement is appropriate. Additionally, it is not necessary for the operator to be notified of or to perceive actuation of the lock-up clutch.

There is a need to provide a control system and method to more efficiently cause the actuation of the lock-up clutch with a level of manipulation that can be imperceptible or minimally perceptible to the operator and/or any passenger(s) of the vehicle.

SUMMARY

According to one aspect of the disclosure, a system for regulating torque transmitted via a torque converter including a lock up clutch from a crankshaft of an engine of a vehicle to an input shaft of a transmission of the vehicle can include a position sensor, an engine speed sensor and a controller. The position sensor can be configured to output data indicative of at least one of an engaged position of the lock-up clutch, a transitional position of the lock-up clutch, and a disengaged position of the lock-up clutch. The engine speed sensor can be configured to output data indicative of rotational speed of the crankshaft. The controller can be in electrical communication with the engine speed sensor and the position sensor and configured to determine when actuation of the lock-up clutch is desired. The controller can also be configured to determine an engine acceleration based on data from the engine speed sensor during a time period in which the controller determines that actuation of the lock-up clutch is desired. The controller can also be configured to determine a torque reduction target based on the engine acceleration, and to signal the engine to output torque substantially equal to the torque reduction target.

According to another aspect of the disclosed subject matter, a method for regulating torque transmitted via a lock-up clutch from a crankshaft of a vehicle engine to an input shaft of a transmission of the vehicle can include providing a controller in communication with an engine speed sensor. The method can include determining an engine acceleration based on data from the engine speed sensor when the controller receives data indicating that engagement of the lock-up clutch is either desired or occurring. The method can also include determining a torque reduction target based on the engine acceleration, and signaling the engine to output torque substantially equal to the torque reduction target.

According to another aspect of the disclosed subject matter, a vehicle powertrain can include an engine including a crankshaft configured to output a variable torque. The transmission can include an input shaft configured to multiply the torque output by the engine and output the multiplied torque. A torque converter assembly can be provided that includes a lock-up clutch, a first input connected to the crankshaft, and a second output connected to the input shaft. The lock-up clutch can include a second input selectively connectable to the first input and a second output connected to the first output, wherein the second input is movable between an engaged position where the second input is connected to the first input and a disengaged position where the second input is disengaged from the first input. A position sensor can be provided and configured to output data indicative of an engaged position of the lock-up clutch and the disengaged position of the lock-up clutch. An engine speed sensor can be configured to output data indicative of the rotational speed of the crankshaft. A controller can be provided in electrical communication with the engine speed sensor and the position sensor and configured to determine an engine acceleration based on data from the engine speed sensor when the controller determines that actuation of the lock-up clutch is either desired or is occurring. The controller can also be configured to determine a torque reduction target based on the engine acceleration, and to signal the engine to output torque substantially equal to the torque reduction target.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
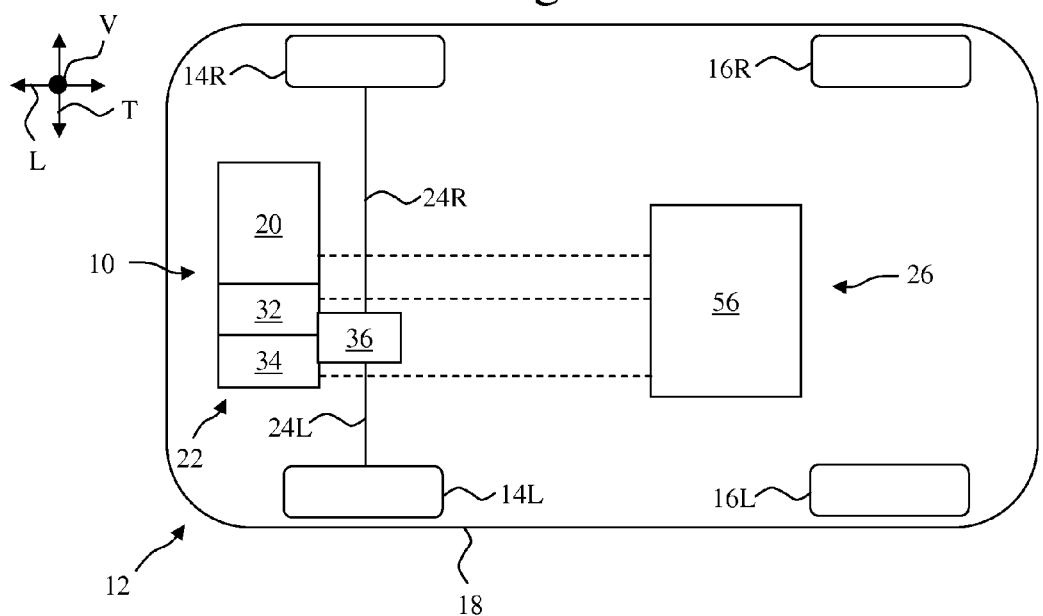
FIG. 1 is a schematic view of a vehicle in accordance with the disclosed subject matter.

FIG. 1 illustrates an embodiment of a powertrain 10 for a vehicle 12 made in accordance with principles of the disclosed subject matter. The vehicle 12 can have a longitudinal direction L, a transverse (or lateral) direction T perpendicular to the longitudinal direction, and a vertical direction V perpendicular to both the longitudinal direction L and the transverse direction T. The vehicle 12 can include a pair of front wheels 14L, 14R, a pair of rear wheels 16L, 16L and a main body 18. The pair of front wheels 14L, 14R and/or the pair of rear wheels 16L, 16R can be pivotally mounted for steering by an operator of the vehicle 12. In the exemplary embodiment of FIG. 1, the pair of front wheels 14L, 14R are configured to receive the steering input from the operator of the vehicle 12.

The main body 18 can include a passenger compartment and a plurality of operator input components (not shown). The passenger compartment can be fully enclosed (for example, as with a sedan, truck, or SUV) or partially enclosed (for example, as with a convertible, a roadster, a side-by-side ATV, a motorcycle, a tractor, a golf cart, or the like).

The powertrain 10 can be configured as a front-wheel drive powertrain, a rear-wheel drive power train, or an all-wheel drive powertrain. If configured as an all-wheel drive powertrain for a four wheel vehicle, the pair of front wheels 14L, 14R can be driven at all times by a power source 20, or one pair of the pair of front wheels 14L, 14R and the pair of rear wheels 16L, 16R can be driven by the power source all of the time and the other pair of the pair of the front wheels 14L, 14R and the pair of rear wheels 16L, 16R can be selectively added to the drive output from the power source 20. This selective addition of the other pair of wheels can be executed by the vehicle operator via a mechanical control assembly or by an electronic control unit with or without direct input from the vehicle operator.

The powertrain 10 can include the power source 20, a transmission assembly 22, a pair of driveshafts 24L, 24R and a control assembly 26.

The power source 20 can be an internal combustion engine, a hybrid of an internal combustion engine and an electric motor, en electric motor, a hydrogen fuel cell motor, or other known motor. The power source 20 can be mounted in various locations, such as closer to the front of the vehicle 12, closer to the rear of the vehicle 12, or intermediate the front and rear of the vehicle 12. In the exemplary embodiment of FIGS. 1 and 2, the power source 20 is configured as a transversely-oriented, front-mounted, internal combustion engine.

Figure 2:
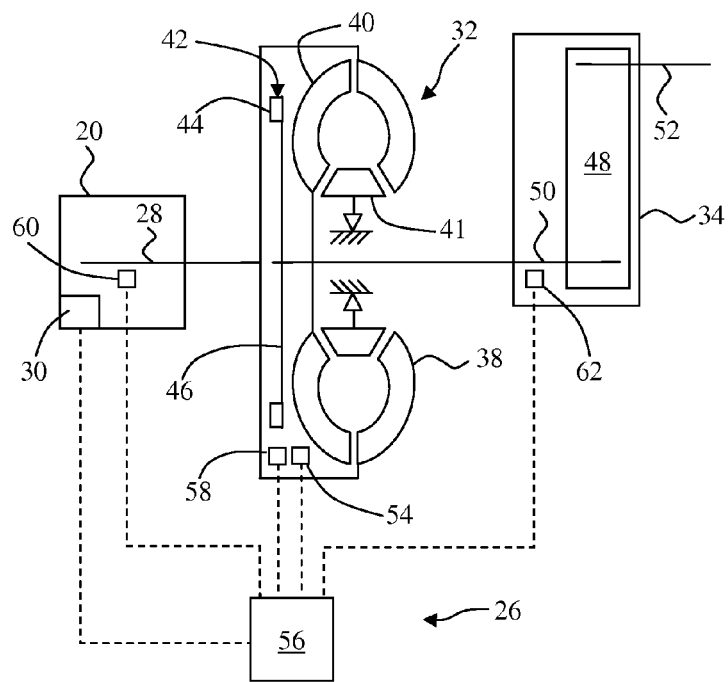
FIG. 2 is a schematic view of a portion of the powertrain for the vehicle of FIG. 1.

Referring to FIG. 2, the internal combustion engine of the power source 12 can include a crankshaft 28 and at least one controlled member 30. The crankshaft 28 can be oriented in the longitudinal direction L or in the traverse direction T of the vehicle 12. In accordance with the exemplary embodiment depicted in FIG. 1, the crankshaft 28 can be oriented in the transverse direction T. The controlled member(s) 30 can include, but is/are not limited to any combination of ignition coil(s), fuel injector(s), intake valve(s), and throttle valve(s).

Referring to FIG. 1, the transmission assembly 22 can include a torque converter assembly 32, a multi-ratio transmission 34 and a differential assembly 36.

FIG. 2 schematically depicts an exemplary embodiment of a torque converter assembly 32, which can be a fluid coupling device that can output torque that is greater than the torque input to the assembly 32. The torque converter assembly 32 can include a converter input member 38, a converter output member 40, a stator 41 and a lock-up clutch 42. The converter input member 38 can be connected to the crankshaft 28 to rotate in unison with the crankshaft 28. Each of the converter input member 38, the converter output member 40 and the stator 41 can include a respective plurality of vanes configured with a particular geometry. Thus, a working fluid located within the torque converter assembly 32 can be manipulated by the vanes of the converter input member 38, the converter output member 40 and the stator 41 such that the converter output member 40 can rotate at a speed different from the input member 38 and such that the converter output member 40 transmits a torque to the multi-ratio transmission that can be greater than the torque generated by the internal combustion engine of the power source 20.

The lock-up clutch 42 can include a clutch input member 44 and a clutch output member 46. The clutch input member 44 can selectively engage with and disengage from the converter input member 38. The clutch output member 46 can be connected to the clutch input member 44 and the converter output member 40 such that these members 40, 44, 46 can rotate in unison. When the clutch input member 44 engages the converter input member 38, the converter output member 40 is forced to rotate in unison with the converter input member 38 thereby bypassing the fluid coupling provided by the working fluid. FIG. 2 illustrates the clutch input member 44 in the disengaged position. When in the engaged position, the input member 44 directly contacts the converter input member 38.

The lock-up clutch 42 can be used to maximize fuel efficiency of the internal combustion engine under certain conditions such as, but not limited to, when the vehicle travels at a steady speed and/or when certain ratios of the multi-ratio transmission 34 are engaged. Under these exemplary conditions, the fluid coupling provided by the working fluid between the converter input member 38 and the converter output member 40 can convert some of the power from the engine into heat due to frictional losses in the fluid. The lock-up clutch 42 can couple the converter input member 38 to the converter output member 40 thereby bypassing the fluid coupling and preventing at least a substantial portion of the power loss due to fluid friction in the working fluid and other inefficiencies inherent in a fluid coupling. As will be further explained, the control assembly 26 can selectively engage and disengage the lock-up clutch 42 based on operating parameters of the vehicle 12 without a direct request from the operator of the vehicle 12.

The multi-ratio transmission 34 can be an automatic transmission or a semi-automatic transmission. As shown in FIG. 2, the transmission 34 can include a gear ratio assembly 48, an input shaft 50 and an output shaft 52. The gear ratio assembly 48 can connect the input shaft 50 to the output shaft 52 such that the output shaft 52 can rotate at variable speeds and can transmit various torques relative to the input shaft 50. The gear ratio assembly 48 can include a plurality of stepped gear ratios or it can have continuously variable gear ratios. The input shaft 50 of the transmission 34 can be referred to as a mainshaft. The transmission 34 can have the input shaft 50 and the output shaft 52 oriented in the longitudinal direction L or in the traverse direction T of the vehicle. The transmission 34 can be mounted closer to the front of the vehicle 12, closer to the rear of the vehicle, or intermediate the front and rear of the vehicle. In addition, the transmission 34 can be mounted at various locations, such as adjacent the power source 20, and spaced a substantial distance from the power source 20. For example, the power source 20 could be configured as a longitudinally-oriented, front-mounted engine and the transmission 34 could be configured as a transversely-oriented, rear mounted transmission. In the exemplary embodiment of FIGS. 1 and 2, the transmission 34 is configured as a transversely-oriented, front-mounted transmission positioned adjacent the power source 20.

Viewing FIGS. 1 and 2 together, the differential assembly 36 can connect each of the driveshafts 24L, 24R to the output shaft 52 of the multi-ratio transmission 34 such that the driveshafts transmit a variable percentage of the torque output by the transmission 34 in response to relative traction levels and relative speeds between the front wheels 14L, 14R. The differential assembly 36 can have any configuration, including, but not limited to, an open-type differential or a limited-slip-type differential.

The control assembly 26 can be configured to manipulate any combination of the internal combustion engine of the power source 20, the multi-ratio transmission 34, and the lock-up clutch 42 in order to most efficiently meet the demands input by the operator of the vehicle 12 via various input components. One exemplary function of the control assembly 26 can be the selection of and movement into the engaged position and the disengaged position of the clutch input member 44.

In particular, the control assembly 26 can be configured to select and effect engagement and disengagement of the clutch input member 44 and the converter input member 38 without direct input from the operator of the vehicle 12. For example, the control assembly 26 can receive inputs related to but not limited to engine speed, engine load, throttle position, gear ratio selection and vehicle speed and then signal to an actuator 54 to move clutch input member 44 into the appropriate engaged or disengaged position.

When clutch input member 44 moves between the engaged and disengaged positions it is possible that the speed and torque at the crankshaft 28 do not match those of the input shaft 50. These differences can cause a slight acceleration (positive or negative) of the vehicle 12 that can be perceived by the operator of the vehicle 12 and/or any passenger(s) in the vehicle 12. Since the control assembly 26, and not the vehicle operator, determines when the lock-up clutch 42 is activated and deactivated, any acceleration resultant from actuation of the lock-up clutch 42 that might be perceived by the operator and/or passenger(s) can be undesirable. Thus, another function of the control assembly 26 can be the minimization of acceleration resulting from the engagement of the clutch input member 44 with the converter input member 38. Further details of this function will be described below with reference to FIG. 3.

The control assembly 26 can include the actuator 54, a controller 56, a position sensor 58, an engine speed sensor 60 and an input shaft speed sensor 62.

The actuator 54 can be any appropriate actuator such as but not limited to a solenoid valve, a servo motor, or a mechanical linkage. In an exemplary embodiment, the actuator 54 can be a hydraulic valve that governs the flow of a portion of the working fluid against one side or the other of the lock-up clutch 42 in order to effect displacement of the clutch input member 44 to either the engaged position or the disengaged position. The actuator 54 can also vary the pressure applied by the clutch input member 44 against the converter input member 38 to modulate the amount of rotational slippage between the clutch input member 44 and the converter input member 38.

The controller 56 can be in electrical communication with the controlled member 30, the actuator 54 and each of the sensors 58, 60, 62. The controller 56 can be referred to as an electronic control unit (ECU) or as a central processing unit (CPU) and can include a single or multiple control units. The ECU 56 referred to herein can be configured with hardware alone, or to run software, that permits the ECU 56 to send, receive, process and store data and to electrically communicate with sensors, manual switches, actuators and/or other ECUs via electrical communication lines (not numbered—shown as dotted lines in FIGS. 1 and 2). These lines can be in the form of wires or can be in the form of wireless communication signals. Electrical communication can be either one-way communication or two-way communication and can be networked or not networked in any manner known in the art.

The position sensor 58 can be any appropriate sensor configured to detect locations of any of the actuator 54, the clutch input member 44, or the clutch output member 46 that correspond to the engaged position and the disengaged position of the clutch input member 44. The position sensor 58 can be configured to output data indicative of these locations.

The speed sensors 60, 62 can be any appropriate sensor configured to detect rotational velocity of a shaft and output data indicative of the rotational velocity.

Each of the sensors 58, 60, 62 can be configured with hardware, with or without software, to perform the assigned task(s). The sensors 58, 60, 62 can be configured as a smart sensor such that sensors 58, 60, 62 can process the raw data collected by the sensors 58, 60, 62 prior to transmission to the ECU 56. Alternatively, each of the sensors 58, 60, 62 can be configured as a simple sensor that passes the raw data directly to the ECU 56 without any manipulation of the raw data. The sensors 58, 60, 62 can be configured to send data to the ECU 56, with or without a prompt from the ECU 56.

Figure 3:
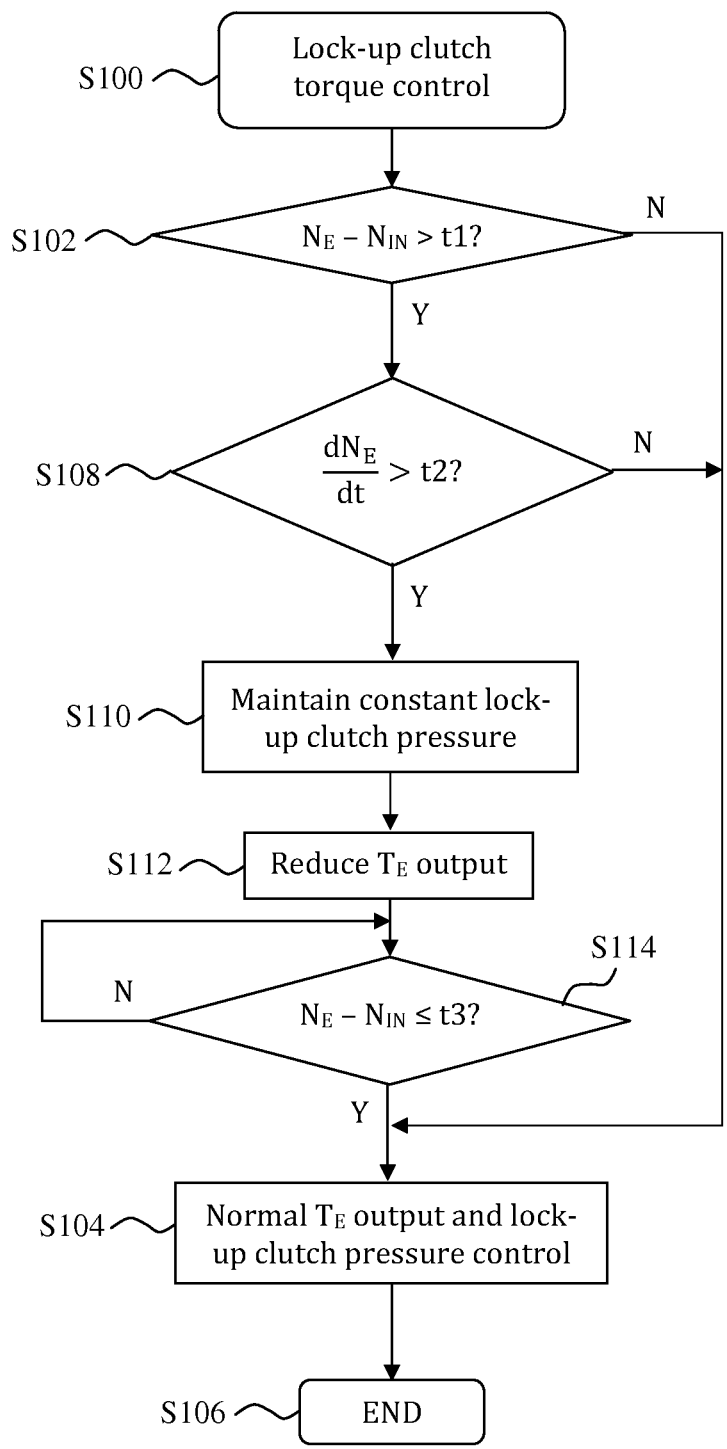
FIG. 3 is a flowchart depicting an algorithm in accordance with the disclosed subject matter.

FIG. 3 illustrates a flowchart of an exemplary algorithm that the ECU 56 can utilize to manage engine torque output during the transition of the clutch input member 44 from the disengaged position to the engaged position. The ECU 56 can begin this algorithm at step S100 after the ECU 56 determines, based on data from the position sensor 58, that the input member 44 is moving from the disengaged position to the engaged position.

From step S100, the ECU 56 can proceed to step S102. At step S102, the ECU 56 can process the data received from the speed sensors 60, 62. Here, the ECU 56 can compare the difference between the engine speed, $N_E$, and the input shaft speed, $N_{IN}$, to a first threshold, t1. The first threshold, t1, can be any appropriate value desired to meet the performance specifications for the vehicle 12. If this difference is less than or substantially equal to the first threshold, t1, then any acceleration due to activation of the lock-up clutch 42 can be considered to be less than a value perceptible by the operator and/or passenger(s) of the vehicle 12 and the ECU 56 can proceed to step S104.

At step S104, the ECU 56 can follow appropriate engine control map(s) that can be advantageous for operation of the vehicle 12 when the lock-up clutch 42 might not adversely affect vehicle acceleration.

From step S106, the ECU 56 can proceed to step S108 where the ECU can exit the engine torque management algorithm.

If the ECU 56 determines at step S102 that the difference between the engine speed, $N_E$, and the input shaft speed, $N_{IN}$, is greater than the first threshold, then the ECU 56 can proceed to step S108.

At step S108, the ECU 56 can process a plurality of data samples from the engine speed sensor 60 to determine an engine acceleration, $dN_E/dt$. Here, ECU 56 can compare the engine acceleration, $dN_E/dt$, to a second threshold, t2. The second threshold, t2, can be any appropriate value desired to meet the performance specifications for the vehicle 12. If the engine acceleration, $dN_E/dt$, is less than or substantially equal to the second threshold, t2, then any acceleration due to activation of the lock-up clutch 42 can be considered to be less than a value perceptible by the operator and/or passenger(s) of the vehicle 12 and the ECU 56 can proceed to steps S104 and S106, as described above.

If the ECU 56 determines at step S108 that the engine acceleration, $dN_E/dt$, is greater than the second threshold, t2, then ECU 56 can take certain actions to avoid perception of actuation of the lock-up clutch 42, such as to manipulate one or more of the controlled member(s) 30 to reduce the torque output by the internal combustion engine of the power source 20. For example, if the decision at step S108 is affirmative, then the ECU 56 can proceed to step S110.

At step S110, the ECU 56 can signal the actuator 54 to maintain a constant pressure of the clutch input member 44 against the converter input member 38. During activation of the lock-up clutch 42 after the initial transition of the clutch input member 44 from the disengaged position to the engaged position, the ECU 56 can vary the pressure applied by the clutch input member 44 against the converter input member 38 to allow an advantageous amount of slippage therebetween. However, varying the pressure during the transition phase can negate the effect of this algorithm. Thus, beginning at step S110, the ECU 56 will maintain this constant pressure until the ECU 56 reaches step S104.

From step S110, the ECU 56 can proceed to step S112. Here, the ECU 56 can generate a target output torque for the internal combustion engine of the power source 20. This target torque can be derived from an appropriate engine map based on one or a combination of appropriate parameters such as but not limited to engine speed, vehicle speed, input shaft speed, engine load, and selected gear ratio. The ECU 56 can issue this target torque as a signal to the controlled member(s) 30. In an exemplary embodiment, the signal can include an ignition retard command and the controlled member(s) 30 can be ignition coil(s).

Upon completion of step S112, the ECU 56 can proceed to step S114. At step S114, the ECU 56 can compare new values of the engine speed, $N_E$, and the input shaft speed, $N_{IN}$. If the difference between these new values is greater than a third threshold, t3, then the engine torque output should be maintained at the reduced target torque. As such, the ECU 56 can return to step S114 and continue evaluation of this difference with subsequent values of the engine speed, $N_E$, and the input shaft speed, $N_{IN}$. The third threshold, t3, can be any appropriate value desired to meet the performance specifications for the vehicle 12.

When the ECU 56 determines at step S114 that the difference is less than or substantially equal to the third threshold, then the ECU 56 can determine that the reduced torque target might no longer be advantageous. As such, the ECU 56 can proceed to step S104 where the ECU 56 can signal the controlled member(s) 30 with a normal operation command, such as but not limited to a normal ignition timing. Also, the ECU 56 can signal the actuator 54 to modulate the pressure between the clutch input member 44 and the converter input member 38, as appropriate.

In following this algorithm, the ECU 56 can minimize or substantially eliminate any acceleration imparted to the vehicle 12 during the initial engagement of the lock-up clutch 42. Thus, the operation of the lock-up clutch 42 can proceed without noticeable perception by the operator and/or any passenger(s) of the vehicle.

While certain embodiments of the disclosed subject matter are described above, it should be understood that the disclosed subject matter can be embodied and configured in many different ways without departing from the spirit and scope of the invention. For example, the ECU 54 can be dedicated to just one or less than the entirety of the internal combustion engine, the multi-ratio transmission and the lock-up clutch, and additional ECU(s) can be dedicated to the remaining one(s). In this alternate embodiment, all of the ECUs can be in electrical communication with one another and with appropriate one(s) of the sensors 56, 58, 60.

In another embodiment, the engine acceleration can be determined by an acceleration sensor separate from the engine speed sensor 50. Any appropriate sensor can be used that can calculate or detect and output data indicative of the rotational acceleration of the crankshaft 28. For example, a data sensor that is configured to indicate overall speed of the vehicle can be used to calculate the rotational acceleration of the crankshaft 28.

The timing at which the ECU 54 decides to implement the torque reduction algorithm can also vary. For example, the ECU 54 can be configured such that whenever it determines that actuation of the lock-up clutch 42 is desirable for a particular reason (e.g., fuel efficiency, torque transmission efficiency, etc.) the ECU 54 can then provide a test period in which the speed and acceleration comparisons with threshold values, as outlined above, is accomplished, and begin actuation of the lock-up clutch only after torque reduction activities are either initiated or accomplished, or possible even only after speed and acceleration comparisons indicate that no torque reduction is necessary. Similarly, the ECU 54 can simultaneously signal for actuation of the lock-up clutch while either beginning or continuing to conduct the speed and acceleration comparisons with threshold values, as outlined above. In this case, the torque reduction activities may occur throughout the process of the lock-up clutch 42 moving from totally disengaged to fully engaged.

Any of the specific features from each of the embodiments of the apparatus and method described above can be interchanged with respective features from other embodiments of the apparatus and method. In other words, each of the various features can be used interchangeably in any of the disclosed and conceivable embodiments and their equivalents. With regard to the disclosed embodiments of the method, the order of operation of each of the method steps can be rearranged with respect to each other, can be sequential, or can be non-sequential. In addition, the method steps can be carried out by the controller, or by other electronic device(s), or even manually be personnel.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for regulating torque transmitted via a torque converter including a lock up clutch from a crankshaft of an engine of a vehicle to an input shaft of a transmission of the vehicle comprising:
   a position sensor configured to output data indicative of at least one of an engaged position of the lock-up clutch, a transitional position of the lock-up clutch, and a disengaged position of the lock-up clutch;
   an engine speed sensor configured to output data indicative of rotational speed of the crankshaft;
   a controller in electrical communication with the engine speed sensor and the position sensor and configured to,
      determine when actuation of the lock-up clutch is desired,
      determine an engine acceleration based on data from the engine speed sensor during a time period in which the controller determines that actuation of the lock-up clutch is desired,
      determine a torque reduction target based on the engine acceleration, and
      signal the engine to output torque substantially equal to the torque reduction target.

2. The system according to claim 1, wherein the controller is further configured to:

select a normal ignition timing when the engine acceleration is less than or substantially equal to an acceleration threshold; and
select a retarded ignition timing when the engine acceleration is greater than the acceleration threshold.

3. The system according to claim 1, further comprising:
an actuator in electrical communication with the controller and connected to the lock-up clutch to displace the lock-up clutch between the engaged position and the disengaged position wherein
the controller is further configured to,
select one of a constant pressure signal and a variable pressure signal based on the engine acceleration, and to select the constant pressure signal when the controller signals the engine to output torque substantially equal to the torque reduction target.

4. The system according to claim 1, further comprising:
a transmission speed sensor configured to output data indicative of the rotational speed of the input shaft, wherein
the controller is configured to compare a first sample of the data from the engine speed sensor with a first sample of the data from the transmission speed sensor when the controller receives data indicative of the engaged position of the lock-up clutch, and
the controller is configured to determine the torque reduction amount based on the comparison of the first data samples and based on the engine acceleration when the comparison of the first samples of data yield a first result.

5. The system according to claim 4, wherein
the controller is configured to,
compare the first samples by determining a first difference that is substantially equal to the first sample of the data from the transmission speed sensor subtracted from the first sample of the data from the engine speed sensor, and
determine the engine acceleration when the first difference is greater than a first threshold.

6. The system according to claim 4, wherein
the controller is further configured to,
determine a second difference by subtracting a second sample of the data from the engine speed sensor from a second sample of the data from the transmission speed sensor, and
select the normal ignition timing when the second difference is less than or substantially equal to a second threshold.

7. The system according to claim 1, wherein
the controller is further configured to,
compare the data from the engine speed sensor with the data from the transmission speed sensor after the controller signals the engine to output torque based on the torque reduction target;
signal the engine to gradually increase the torque output by the engine based on the comparison of the engine speed sensor with the data from the transmission speed sensor after the controller signals the engine to output torque based on the torque target.

8. A method for regulating torque transmitted via a lock-up clutch from a crankshaft of a vehicle engine to an input shaft of a transmission of the vehicle, comprising:
providing a controller in communication with an engine speed sensor;
determining an engine acceleration based on data from the engine speed sensor when the controller receives data indicating that engagement of the lock-up clutch is either desired or occurring;
determining a torque reduction target based on the engine acceleration; and
signaling the engine to output torque substantially equal to the torque reduction target.

9. The method according to claim 8, further comprising:
selecting a normal ignition timing when the engine acceleration is less than or substantially equal to an acceleration threshold; and
selecting a retarded ignition timing when the engine acceleration is greater than the acceleration threshold.

10. The method according to claim 8, further comprising:
providing a constant pressure to the lock-up clutch when signaling the engine to output torque substantially equal to the torque reduction target.

11. The method according to claim 8, further comprising:
providing a transmission speed sensor;
comparing a first sample of data from the engine speed sensor with a first sample of data from the transmission speed sensor when the controller determines that actuation of the lock-up clutch is either desired or occurring; and
determining the torque reduction amount based on comparison of the first sample of data from the engine speed sensor with the first sample of data from the transmission speed sensor and based on the engine acceleration when comparison of the first sample of data from the engine speed sensor with the first sample of data from the transmission speed sensor yields a first result.

12. The method according to claim 11, wherein:
comparing includes determining a first difference substantially equal to the first sample of data from the transmission speed sensor subtracted from the first sample of data from the engine speed sensor; and
determining the engine acceleration includes determining the engine acceleration when the first difference is greater than a first threshold.

13. The method according to claim 11, further comprising:
determining a second difference by subtracting a second sample of data from the engine speed sensor from a second sample of data from the transmission speed sensor; and
selecting the normal ignition timing when the second difference is less than or substantially equal to a second threshold.

14. The method according to claim 11, further comprising:
comparing the data from the engine speed sensor with the data from the transmission speed sensor after the controller signals the engine to output torque based on the torque reduction target;
signaling the engine to gradually increase the torque output by the engine based on the comparison of the engine speed sensor with the data from the transmission speed sensor after the controller signals the engine to output torque based on the torque target.

15. A vehicle powertrain comprising:
an engine including a crankshaft configured to output a variable torque;
a transmission including an input shaft configured to multiply the torque output by the engine and output the multiplied torque;
a torque converter assembly including a lock-up clutch, a first input connected to the crankshaft, and a first output connected to the input shaft, wherein the lock-up clutch includes a second input selectively connectable to the first input and a second output connected to the first output, wherein the second input is movable between an engaged position where the second input is connected to the first input and a disengaged position where the second input is disengaged from the first input;

a position sensor configured to output data indicative of an engaged position of the lock-up clutch and the disengaged position of the lock-up clutch;

an engine speed sensor configured to output data indicative of the rotational speed of the crankshaft;

a controller in electrical communication with the engine speed sensor and the position sensor and configured to, determine an engine acceleration based on data from the engine speed sensor when the controller determines that actuation of the lock-up clutch is either desired or is occurring;

determine a torque reduction target based on the engine acceleration; and signal the engine to output torque substantially equal to the torque reduction target.

16. The system according to claim 15, wherein
the controller is configured to,
select a normal ignition timing when the engine acceleration is less than or substantially equal to an acceleration threshold, and
select a retarded ignition timing when the engine acceleration is greater than the acceleration threshold.

17. The system according to claim 15, further comprising:
an actuator in electrical communication with the controller and connected to the lock-up clutch to move the lock-up clutch between the engaged position and the disengaged position, wherein
the controller is further configured to,
select one of a constant pressure signal and a variable pressure signal based on the engine acceleration, wherein the controller is configured to select the constant pressure signal when the controller signals the engine to output torque substantially equal to the torque reduction target, and
output to the actuator the selected one of the constant pressure signal and the variable pressure signal.

18. The system according to claim 15, further comprising:
a transmission speed sensor configured to output data indicative of the rotational speed of the input shaft, wherein the controller is further configured to compare a first sample of data from the engine speed sensor with a first sample of data from the transmission speed sensor when the controller receives data indicative of the engaged position of the lock-up clutch, and the controller is configured to determine the torque reduction amount based on the comparison of the first sample of data from the engine speed sensor with the first sample of data from the transmission speed sensor and based on the engine acceleration when the comparison of the first samples of data yield a first result.

19. The system according to claim 18, wherein
the controller is configured to
determine a first difference that is substantially equal to the first sample of data from the transmission speed sensor subtracted from the first sample of data from the engine speed sensor, and
determine the engine acceleration when the first difference is greater than a first threshold.

20. The system according to claim 18, wherein
the controller is further configured to,
determine a second difference by subtracting a second sample of data from the engine speed sensor from a second sample of data from the transmission speed sensor, and
select the normal ignition timing when the second difference is less than or substantially equal to a second threshold.

21. The system according to claim 15, wherein
the controller is further configured to,
compare data from the engine speed sensor with data from the transmission speed sensor after the controller signals the engine to output torque based on the torque reduction target, and
signal the engine to gradually increase the torque output by the engine based on comparison of data from the engine speed sensor with the data from the transmission speed sensor after the controller signals the engine to output torque based on the torque target.

* * * * *